INVENTORS.
Jack H. Phillips
John E. Peirce

United States Patent Office 3,164,217
Patented Jan. 5, 1965

3,164,217
WEIGHING DEVICE
John E. Peirce, State College, Pa., and Jack H. Phillips, Tulsa, Okla., assignors to Ozark-Mahoning Company, Tulsa, Okla., a corporation of Delaware
Filed July 5, 1962, Ser. No. 207,560
5 Claims. (Cl. 177—1)

This invention relates to processes of and apparatus for the exact weighing and feeding of granular solid materials or heavy viscous liquids, such liquids or materials either coming from, or going to chemical processes or the like, with provision of continuous records, tare weights, check weights, the utilization of continuous, automatic, compensating feeders, etc.

Preamble

In the practice of manufacturing processes involving the feeding or discharging of granular solids and/or viscous liquids, it is often desirable to be able to control, or measure by weight, the exact amounts thereof being fed to or discharged from such processes in order that process records of production and/or precise control of the processes may be achieved. As an example, in the production of hydrogen fluoride gas in a rotating generator, both fluorspar and sulfuric acid must be metered into the process accurately, to insure successful operation of the generator and prevent excessive losses of expensive fluorspar in the process tailings. Metering of the liquid sulfuric acid can be accomplished by means of conventional rotometers giving satisfactory results. Metering of the fluorspar, however, is another story.

The art is aware of various devices which have been used to accomplish the actual metering of fluorspar into the process. These conventional devices have prominent weaknesses in that they require frequent manual checks for calibration and do not compensate continuously for dead load build up on the weighing device or previously weighed material in the form of granular material or dust which is not expelled completely. Many weighing devices do not give a complete dust-tight seal for the material being weighed, thus, some material may escape to the atmosphere; nor do they provide adequate seals at the entry or discharge points in order to prevent dust or gases from a given process entering into or escaping from the weighing device.

The Specific Art

Specifically, a first well understood conventional mechanism for weighing and feeding solids is a belt conveyor placed on a scale beam. The numerous objections to this type of weighing device include:

(a) Does not provide a dust-tight or gas-tight enclosure for the material being conveyed or the conveying mechanism;

(b) Does not have any means for automatic continuous check weight, the method for check weight of capacity being a grab sample weight on a separate check scale. This procedure is quite inaccurate because it is a small sample and depends on the speed and coordination of a man putting the sample container in the stream of material and taking it out at the precise time;

(c) Gets out of calibration from time to time due to varying amounts of material which cling or stick to the belt and travel as a circulating load; and (d) Does not lend itself to feeding or weighing heavy viscous liquids in any form.

A second known mechanism for weighing is a bulk weighing scale. The device comprises a single hopper suspended on a scale beam, which fills to a predetermined weight, weighs, and then dumps. The numerous objections to this type of weighing device include:

(a) Does not lend itself well to continuous feeding because of the time lag between dumps;

(b) Does not have any means for automatic continuous check weight. Objections to the method of check weight, supra, apply; and (c) Depends on hopper emptying completely after each weighing. However, it is impossible to empty a hopper complete since some solid material will cling to the sides and fine materials will have a heavy dust load in the hopper. These effects cause errors in weighing since any material which is left in the hopper will be weighed more than once.

Objects

Therefore, an object of the invention is to provide weighing devices and processes which are completely enclosed so as to be dust, gas and weather tight and operate satisfactorily either outdoors or indoors, including situations wherein operating conditions are objectionable because of dust or corrosive gases from the processes involved.

Another object of the invention is to provide weighing apparatus and processes which readily permit use therewith of any well known weighing means such as scale or hydraulic weigh cells.

Another object of the invention is to provide weighing apparatus and processes which always leave an exact tare load in the weighing hopper or hoppers (whereby to compensate for the fact that any vessel cannot be emptied completely but only to a degree depending on the characteristic of the material being weighed) and by virtue of leaving said given tare weight in the hopper, in each weighing cycle, make unimportant where or how material residues may be left in the system, as said retained material is tare weighed each cycle and not double weighed when the next charge is admitted.

Another object of the invention is to provide weighing apparatus and processes employing a continuous tare whereby to completely and adequately allow for any build up of foreign material on the outside of the hoppers or weighing devices.

Another object of the invention is to provide weighing apparatus and processes employing continuous, uniform feeding of materials based on exact weighing coupled with time cycle controls.

Another object of the invention is to provide weighing apparatus and processes wherein automatic checks and corrections of feed rate are provided so that, if a small percentage of overweight or underweight exists during a cycle, corrections during the next cycle will compensate such errors.

Another object of the invention is to provide weighing devices and processes which will operate to weigh heavy viscous liquids; such being possible because it is not necessary at any time to empty completely the hoppers of the system.

Another object of the invention is to provide systems and processes to weigh accurately where (a) continuous feed to the weighing system is present (as from a process) with permitted intermittent feed therefrom (as to storage) or (b) vice versa.

Other and further objects of the invention will appear in the course of the following description thereof.

Drawings

In the drawings, which form a part of the instant specification and are to be read in conjunction therewith, embodiments of the invention are shown.

FIG. 1 Apparatus

Figure 1:
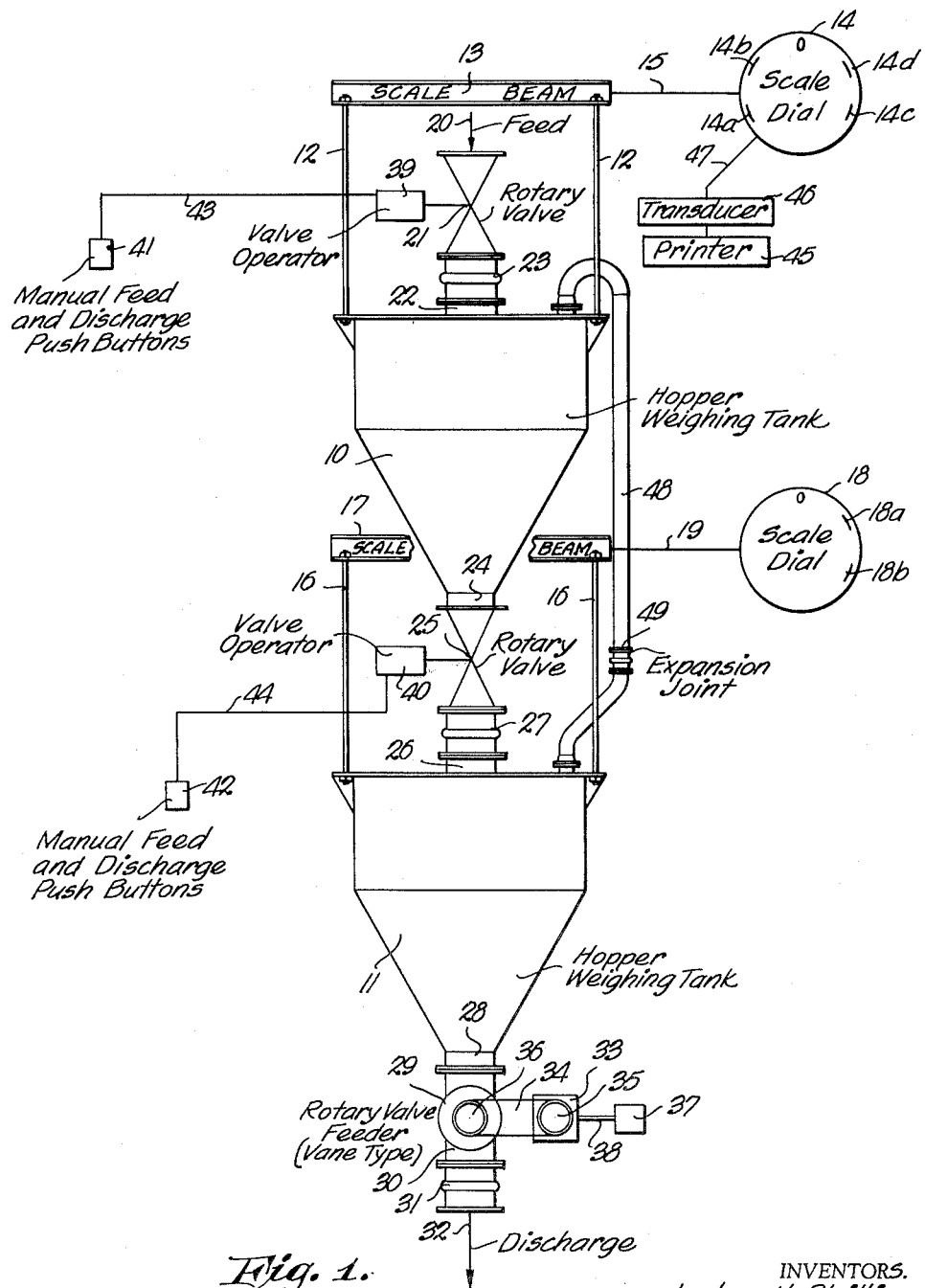
FIG. 1 is a schematic flow diagram of a first form of the subject weighing device, with intermittent feed coming from storage facilities and continuous discharge going to a process.

Referring first to FIG. 1, at 10 is designated an upper hopper or weighing tank and at 11 a lower hopper or weighing tank. Upper tank 10 is suspended by rods or beams 12 from a conventional weighing device such as a scale beam or hydraulic weigh cell 13 having a scale dial 14 or its equivalent connected therewith. Conventional communication from scale beam or weigh cell 13 to dial 14 is schematically indicated by line 15. Likewise, lower tank 11 is suspended by rods or beams 16 from a like weighing device 17 having scale dial 18 with conventional communication means between 17 and 18 indicated schematically by line 19.

Any conventional feed source or means for upper hopper 10, such as a conveyor or the like, typically coming from storage, is schematically designated at 20 feeding conventional rotary valve 21. The latter is connected to upper hopper 10 by flow line or passage 22 having expansion joint 23 thereon. The discharge from upper tank 10 is into line or passage 24, thence into second rotary valve 25 which discharges into line 26 into lower hopper 11 through expansion joint 27.

Discharge from the lower tank 11 is through line or passage 28 into a rotary valve feeder 29 of the vane type which discharges into line 30 connecting into expansion joint 31. Ultimate discharge, typically a continuous feed to a process, is indicated by arrow 32. Feeder 29 is controlled by variable speed drive 33 communicating therewith by chain or belt 34 on pulleys or sheaves 35 and 36 on drive 33 and feeder 29, respectively. An inching motor 37 is connected as at 28 to variable speed drive 33.

Valve operators 39 and 40 of conventional type have manual feed button 41 and manual discharge button 42 connected therewith through schematically indicated conventional connections 43 and 44, respectively. A printing device of conventional type adapted to print the weight indicated on scale dial 14 is provided as at 45 and the operative connection therewith (preferably through transducer 46) is schematically indicated by line 47. Vent connection 48 communicates between the upper ends of upper and lower hoppers 10 and 11 and has expansion joint 49 therein.

FIG. 1 Process

The process as carried out in FIG. 1 will now be described.

By means of the manual feed and discharge push buttons 41 and 42, valves 21 and 25 are opened (operated) by the controller or operator to put a given tare load of, say, one hundred pounds of material, into both of upper hopper 10 and lower hopper 11. At this time, the system may be switched to automatically controlled weighing and feeding if such is employed. However, the process and operation will be described as if all the components thereof were operated by one or more human operators or controllers (which may well be done) in order to avoid the necessity of showing an excess of essentially conventional electrical control equipment and the like. The steps of operation will now be described sequentially.

(1) Rotary valve 21 is opened for the second time by means of valve operator 39 by the controller whereby to allow material feed to continuously enter upper weighing tank 10. As previously noted, tank 10 is suspended on scale beam or hydraulic weigh cell 13. As may be seen from the drawing, the upper and lower tanks are isolated from one another and other equipment to allow free travel of scale beams 13 and 17 by virtue of expansion joints 23, 27, 31 and 49.

(2) When upper scale dial 14 reaches (rising weight) from 90 to 95 percent of the weight required and desired in upper tank 10, the dial indicator reaches a marked zone 14a. Zone 14a may be electrically connected to a flashing light, bell or the like or other conventional means to signal the operator, if desired, when the dial indicator reaches same. At this time, the controller, through valve operator 39, closes (slows) valve 21 to such degree as to allow only a dribble feed. When the indicator of scale dial 14 reaches the exact desired weight, it enters marked scale dial zone 14b where, again, if desired, a signal may be sent or made to the human controller. Alternatively, on merely seeing the indicator reach the desired zone 14b, he closes (stops) rotary valve 21 completely. The controller then actuates printer 45 to print the exact weight of material added to tank 10 (including tare) during the above described cycle. Alternatively, the controller himself may record the weight by hand.

(3) After printing, the controller then actuates valve operator 40 to open rotary valve 25. (It should be noted that rotary valves 21 and 25 could be actually operated by hand at differing speeds as noted above, but it is most convenient to utilize the entirely conventional valve operator system noted.) Simultaneously, the controller starts rotary valve feeder 29 into *continuous* operation by actuation of variable speed drive 33.

(4) When the upper scale dial 14 (falling weight) reaches 110 to 105 percent of predetermined tare weight (here one hundred pounds) it comes into scale dial marked zone 14c. Again, optionally, a signal may be made from electrical contact in this zone with the indicator to the controller. The controller slows valve 25 to a dribble feed. When the indicator reaches 14d, tare, the controller then closes (stops) lower rotary valve 25 completely. The controller then actuates printer 45 whereby to print the exact (substantially tare) weight of upper hopper 10 (or again himself records).

(5) The controller then starts the system through a repeat of the sequence beginning step (1), supra.

(6) Referring to scale dial 18, two marked zones 18a and 18b are provided thereon above and below tare weight in the lower hopper 11. These zones may have thereat suitable conventional electrical means connected to bells or flashing light signals, as desired. Alternatively, the controller, or a second controller, may read the dial directly. Before step (3), supra, begins, the operator inspects scale dial 18 to see whether the indicator thereon is on tare, or on zone 18a or 18b. If the tare weight in the lower hopper 11 is below the hundred pound preset minimum, for example, the dial indicator will be in the under weight zone 18a and the controller will then, by suitable conventional control means, decrease the feeding rate of the rotary valve feeder preferably by means of controls on the inching motor 37 acting on variable speed drive 33. On the other hand, if the tare weight is over the optimum one hundred pounds, the scale dial 18 indicator will be in zone 18b whereby the controller will cause inching motor 37 to affect variable speed drive 33 whereby to speed up rotary valve feeder 29, thus discharging material at a greater rate. Thus, as the ratio of feeds to rotary valve 25 and rotary vane feeder 29 vary, an increase over the tare weight in lower hopper 11 will operate (through the controller) to speed up rotary vane feeder 29, while a decrease under the tare weight will cause the controller to slow down feeder 29.

With respect to further explanation of the operation of the weighing device and facets of the said operation, the following points may be made:

(a) In providing the desired, say, one hundred pound tare weight in each of the upper hopper 10 and lower hopper 11 at the beginning of the operating cycle, upper rotary valve 21 may be manually operated to pass, say, two hundred pounds into upper hopper 10. Then, feed through valve 21 is stopped. Thereafter, manual operation of lower rotary valve 25 may be employed to pass one hundred of said two hundred pounds, or thereabout, into lower tank 11. The tare amount must be larger than possible internal and external hold-over which generally is proportional to the size and volume of the weighing equipment. Thus, the tare must exceed the internal and external dead loads accumulatable on the equipment in its use over an indefinite period of time. Internal loads would, for example, include all material which would remain, for tank 10, between expansion joints 23 and 27, while comparable internal dead load for tank 11 would be between expansion joints 27 and 31. External dead loads for tank 10 would include any accumulating external load between expansion joints 23 and 27 relative to tank 10, including on the weighing apparatus itself, the same to be true for tank 11 between expansion joints 27 and 31.

(b) In utilizing a 12-minute total time cycle, for example, by the controller, after the initial tare weights are in the two weighing tanks 10 and 11, feed to tank 10 would typically take two to three minutes. After said feed stops, the weight of upper tank 10 is printed after a short (material settling) lag. Afer six minutes, the controller starts both valves 25 and 29, with valve 29 running continuously thereafter until manually stopped. After three more minutes, the controller closes valve 25 some 90 percent and then closes it finally. After a material settling lag, the controller again prints the weight of upper tank 10. The time schedule previously developed should take to slightly over nine minutes. At twelve mnutes, the total cycle previously defined, feed through upper valve 21 is again commenced. At eleven minutes, one minute before commencing feed through rotary valve 21, the operator evaluates the zones in scale dial 18 to determine whether to have the inching motor 37 speed up or slow down the rate of rotary valve feeder 29. If feeder 29 is running at the proper rate, lower hopper 11 will be at tare weight (one hundred pounds) precisely one minute before lower rotary valve 25 opens to start passing material into the lower tank.

(c) Upper hopper 10 receives its charge at an exact given time interval. In the event that it is desired to utilize a clock timer to time the entire system, such may be employed. In such case, the accuracy of the over-all weight of the weighing device would depend on the accuracy of any given electric clock timer. It is a well-known fact that any electric clock operating on 60-cycle current will operate over an indefinite period without gaining or losing a minute, provided there is not a power interruption.

(d) The exact rate at which the hopper 10 is filled is not important, except that it must be filled at a rate fast enough to allow ample time for the controller to weigh, empty and tare hopper 10 before the time of the next charge cycle. It is also important that the controller close feed valve 21 to a dribble feed for the last pounds. A few seconds after upper rotary valve 21 closes, the controller actuates printer 45 associated with the scale or weigh cell upon which upper hopper 10 is suspended whereby to print the exact weight of the material which has been put into the hopper plus the tare weight of material put into the hopper at the initial start of the weighing cycle. The reason for the few seconds delay before weighing is to allow for the small amount of material which enters the hopper during the final closing of the feed valve 21 to settle.

(e) After he causes printing of the initial weight of upper hopper 10, the controller opens lower discharge valve 25. The time between starting signals for each of the valves 21 and 25 is exactly the same. Upper and lower rotary valves 21 and 25 run approximately the same elapsed time, the only difference being that valve 25 is not started or opened until the weighing and printing operation immediately described has taken place.

(f) The exact rate at which upper hopper 10 empties is not important except that it must be emptied down to the tare weight a few minutes before the controller starts upper rotary valve 21 for the second time.

Lower rotary valve 25 is closed to a dribble feed for the last few pounds and, a few seconds after the controller closes valve 25, the tare weight of the upper hopper 10 is caused to be printed by the controller. Zones 14c and 14d are positioned so as to cause the operator to stop lower rotary valve 25 on substantially the same tare weight each time, which is substantially the predetermined amount of material put into tank 10 manually at the beginning of operation.

The reason for leaving a tare charge in tank 10 is that it is impossible to insure that one empties tank 10 completely since small amounts of material will cling to the walls of the tank and, also, with fine material, a certain amount of material stays in the tank in the form of dust. By leaving a given amount in the tank, one can control, through the scale, where this amount is the same each time, and it is not important where it is located in the tank or in what form it may be, granular, fine or dust.

(g) By subtracting the printed tare weight from the printed weight when tank 10 was filled and also because the filling and discharging takes place in an exact time interval, one has a continuous record of the exact time and amount of material passing through the system which gives the rate of flow therethrough.

(h) Lower hopper 11, which receives material from upper hopper 10, also suspended on a scale beam, has the function of distributing this material continuously and evenly between discharges of hopper 10. This is done by means of rotary vane feeder 29 driven by variable speed drive 33. Hopper 11, as noted above, contains a given tare weight put in manually before the system is put on cycle. Once the cycles are under way, at approximately one minute before lower rotary valve 25 is opened, vane feeder 29 should have discharged hopper 11 down to near the given tare weight and to exactly the same weight each time for a given cycle. If this weight is over or under tare, zones 18a and 18b in scale dial 18 permit the controller to operate the inching motor 37 to affect the variable speed drive 33 in such manner as to increase or decrease the speed of the vane feeder 29. If vane feeder 29 itself is on manual operation, this may be merely speeded or slowed at command from the operator. This means that small overage or underage for one given cycle will be compensated for during the next cycle.

Thus it is seen that the apparatus and process of FIG. 1 provides for an intermittent flow into the upper hopper or weighing tank 10 with a continuous flow out of the lower hopper or tank 11. This, typically, is the situation where material is being moved from a static storage depot or pile into a continuous production line. The apparatus and process of FIG. 2, on the other hand, handles the opposite situation, namely, one where there is a constant flow into the upper tank with an intermittent flow out of the tank. This is the typical situation where a continuous production flow line is passed intermittently to storage.

It should be emphasized that the tare weight passed into lower hopper 11 should be so gauged and controlled that the indicator of scale dial 18 initially falls between the zones 18a and 18b. Likewise, the same is true of the scale pointer for scale dial 14, which should initially fall between zones 14c and 14d at taring.

FIG. 2 Apparatus

Figure 2:
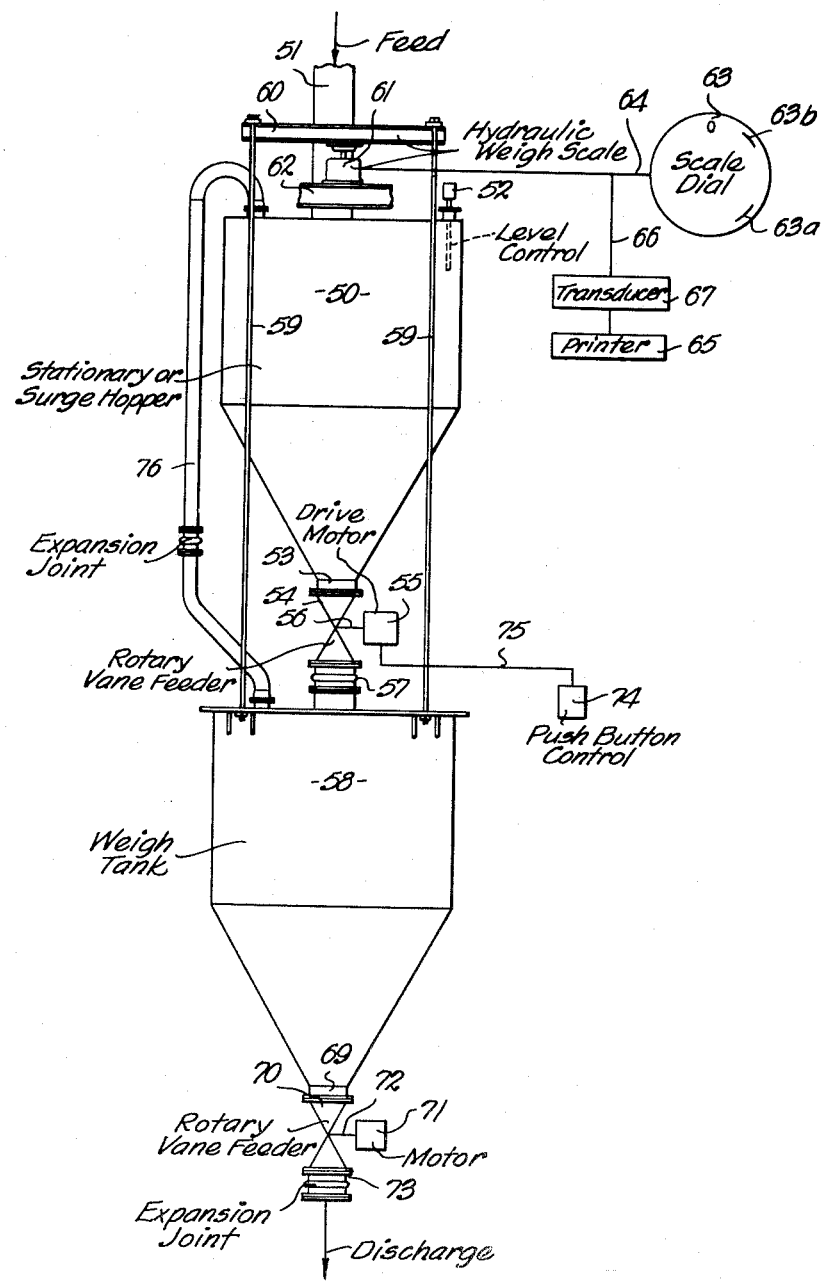
FIG. 2 is a schematic flow diagram of a second form of the subject weighing device with continuous feed coming from a process intermittent product discharge to storage.

Referring to FIG. 2, therein is shown a modification of the subject apparatus and process adapted to receive a continuous flow of fluent material from, for example, a production line, with intermittent discharge of weighed fluent material (typically) to storage.

The apparatus and process of FIG. 2, like those of FIG. 1, will be described as operated by one or more human controllers. It should be understood, however, that automatic controls could be employed.

At 50 is designated a stationary, rigidly mounted upper tank or surge hopper, the support means of which are conventional and are not shown. First feed line 51 carries fluent material from a source such as a production line (not shown) into hopper 50. Hopper 50 has a content sensor 52, here a conventional level indicator and control which has suitable means coupled therewith to indicate when a certain level is reached, such as a bell or flashing light. Withdrawal line 53 leads from the bottom of hopper 50 and passes to conventional rotary vane feeder 54 which is driven by motor 55 through shaft 56. A decoupling expansion joint 57 is positioned on line 53 with the lower end of line 53 communicating with the upper end of lower weigh tank 58. Weigh tank 58 is suspended by means such as elongate vertical rods or beams 59 from horizontal beams 60. The latter is carried by any conventional weighing means such as an hydraulic weigh cell 61 or scale beam mounted on structurals 62. Hydraulic weigh cell 61 is coupled with any conventional scale dial generally designated at 63 by suitable conventional means schematically indicated at 64. Tape weight printer 65 of conventional type is tied by line 66 through transducer 67 to scale dial 63 whereby to be able to print the weight indicated thereon as desired. Any suitable conventional means are employed here.

Vent connection 76 having expansion joint 68 thereon communicates between the upper ends of lower weigh tank 58 and upper surge hopper 50. Discharge line 69 from the bottom of lower weigh tank 58 passes to conventional rotary vane feeder 70 driven by electric motor 71 through shaft 72. Expansion joint 73 is positioned on line 69 immediately below feeder 70. A manual push button start means schematically indicated at 74 is tied to the drive motor 55 through suitable conventional communication means 75 whereby to permit manual start and stop of rotary feeder 54. Feeders 54 and 70 may be manually operated if desired as in the case of valves 21 and 25 and feeder 29 in FIG. 1.

*FIG. 2 Process*

Turning to the practice of the process in the apparatus of FIG. 2, feed of fluent material passes into line 51 unimpeded by any valve, and thence into hopper 50. As soon as at least some quantity of fluent material is in hopper 50, control 74 may be actuated to operate rotary vane feeder 54. By this means, a given tare charge of, say, 100 pounds, is put into lower weight tank 58, which is suspended from hydraulic weigh cell 61. Upper hopper 50 is a stationary hopper used as a surge container to accommodate a continuous or fluctuating flow of material from production. Both rotary vane feeders 54 and 70 must operate at a rate in excess of twice the production rate or flow entering hopper 50. Weigh tank 58 is isolated from all stationary equipment whereby to allow free travel and function of weigh cell 61, by means of expansion joints 57, 73 and 68.

The successive steps after insertion of the tare charge (gauged by dial 63) may now be recited.

(1) Continuous production of fluent material of feed from any suitable source enters upper tank 50 through line 51 and fills tank 50 until the level therein reaches level controller 52. At this point, the operator, signalled by the level controller, actuates drive motor 55 on upper vane feeder 54 by push button control 74.

(2) Fluent material passing through vane feeder 54 into lower weigh tank 58 increases the weight thereof and the indicator on scale dial 63 ultimately reaches first upper limiting zone 63a on scale dial 63. Zone 63a may be electrically energized so that contact on the indicator therewith signals the controller by flashing light or bell or, alternatively, the controller merely watches the dial until it reaches zone 63a. The controller then stops drive motor 55 through push button control 74 and thus vane feeder 54. The controller waits for a fifteen-second or other suitable time delay period to allow vane feeder 54 to come to a complete stop and all in transit material to settle out. After elapse of the time delay, the controller actuates tape printer 65 whereby to print the exact weight of material in lower hopper 58 (or himself records same).

(3) Thereafter, after a second brief, say, fifteen-second delay, the controller starts lower drive motor 71 at the end thereof, thus starting lower vane feeder 70. A second zone 63b is provided on scale dial 63 positioned in the desired tare weight range (say, 98 to 102 pounds) (with optional suitable signalling means to the controller such as flashing light or bell) whereby, when the scale dial indicator contacts same in its downward fall, the controller, alerted, will stop feeder 70 on lower line 69. A suitable delay then passes to permit the lower vane feeder to come to a complete stop and all in transit material to discharge and settle out. After a lapse of this time delay, say, fifteen seconds, the controller actuates printer 65 again whereby to print the exact present tare weight of the material in lower hopper 58 (or himself records).

(4) The unit now sits idle until stationary upper hopper 50 fills up whereby to actuate, for the second time, level controller 52, at which time the weighing device and system repeats the above listed steps.

At any time, total production through the weighing system can be computed from the printer tape by adding the differences of initial weights and tare weights as recorded on tape printer 65 or by the operator.

Rotary valves and vane feeder of suitable conventional type are disclosed in Bulletin F-5a of the Fuller Company, of Catasauqua, Pa., a subsidiary of the General Transport Corp., pp. 4–7, inclusive, entitled "Fuller Feeders and Rotary Valves." Weight cells of suitable conventional type may be found in Catalog A-16 of the A. H. Emery Company, of New Canaan, Conn., see page 5 and Patent 2,960,113, the catalog entitled "Hydraulic and Pneumatic Load Cells, etc." Level indicators are typically seen in Bulletin I-5-C of the Fuller Company, supra, entitled "Fuller Material-Level Indicators, etc.," see p. 5, etc.

From the foregoing it will be seen that this invention is one well adapted to attain all of the ends and objects hereinabove set forth together with other advantages which are obvious and which are inherent to the structure and process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A process of weighing fluent materials on an intermittent input basis and a continuous output basis comprising flowing fixed tare weights of the fluent material into a first weighing tank and a second weighing tank, then feeding a weigh amount of the fluent material into the first weighing tank, weighing and recording the weight of the first weighing tank, thereafter flowing fluent material from the first weighing tank into the second weighing tank, stopping said flow when the residual amount in the first weighing tank approximates the tare weight therein, then weighing and recording the weight of the first weighing tank, and flowing fluent material from the second weighing tank at a controlled rate simultaneously with the flow into said second tank from the first weighing tank.

2. A process as in claim 1 including again flowing fluent material to be weighed into the first weighing tank while continuously flowing fluent material from the second weighing tank, and controlling the rate of flow from the second weighing tank as to maintain at all times at least a substantial tare amount therein.

3. A process as in claim 1 including controlling the rate of feed into the first weighing tank by reducing same to a dribble feed as the weigh amount is approximated, and controlling the rate of feed into the second weighing tank wherein flow therebetween is reduced to dribble feed as the tare amount in the first tank is approached on drain thereof.

4. A process of weighing fluent materials on a substantially continuous input basis and intermittent output basis comprising flowing a fixed tare weight of the fluent material into a weighing tank, then feeding at least a minimum quantity of fluent material into a surge hopper, then flowing said fluent material from the surge hopper into the weighing tank, stopping flow of said fluent material from the surge tank into the weighing tank when the total amount in the weighing tank reaches a predetermined amount, weighing and recording the weight of the weighing tank after stopping said flow thereinto, thereafter flowing fluent material from said weighing tank until the previously mentioned tare weight is reached, then stopping said fluent material flow from said weighing tank and thereafter weighing said weighing tank and recording said weight.

5. A process as in claim 4 wherein said hopper is fed substantially continuously and fluent material is fed from said hopper and said lower weighing tank at a rate in excess of twice the flow rate entering the hopper.

References Cited in the file of this patent
UNITED STATES PATENTS

| | | |
|---|---|---|
| 2,079,802 | Hauk | May 11, 1937 |
| 2,298,967 | Richardson | Oct. 13, 1942 |
| 2,408,221 | Michel | Sept. 24, 1946 |
| 2,434,177 | Richardson | Jan. 6, 1948 |
| 2,720,375 | Carter | Oct. 11, 1955 |